Sept. 6, 1955

C. B. GREESON 2,717,136

HOSE HOLDER

Filed Sept. 29, 1949

INVENTOR.
CLARETT B GREESON
BY
Emerson B Donnell

Sept. 6, 1955     C. B. GREESON     2,717,136
HOSE HOLDER

Filed Sept. 29, 1949     2 Sheets-Sheet 2

INVENTOR.
CLARETT B. GREESON
BY
Emerson B Donnell

United States Patent Office 2,717,136
Patented Sept. 6, 1955

2,717,136

HOSE HOLDER

Clarett B. Greeson, Rockford, Ill., assignor to J. I. Case Company, Racine, Wis., a corporation of Wisconsin Application September 29, 1949, Serial No. 118,644

6 Claims. (Cl. 248—75)

My invention relates to a device for preventing the break-away couplings on hydraulically equipped vehicles from contacting the ground when the vehicles suddenly become separated. My invention further relates to a device wherein the slack of the hydraulic conduits or hoses of hydraulically equipped vehicles is taken up and damage resulting from dragging the conduits is substantially lessened.

Valved break-away couplings of the type which commonly include a male connecting member and a female connecting member which are adapted to be releasably interengaged with one another, each of the members being adapted to be attached to a separate fluid conduit, are particularly useful in hydraulic systems in which the members frequently are connected and disconnected, as for example in the hydraulic systems which extend between coupled vehicles, wherein a hydraulic pressure unit in one vehicle is attached to operate on hydraulically actuated devices on other vehicles. If, due to striking an obstruction, or for any other reasons, the two vehicles suddenly become separated, one member of the break-away coupling is pulled away from the other member thereby stopping the flow of pressure between the two vehicles and, as in farm machines, allowing one of the coupling members to drop to the ground. Because of the nature of these break-away couplings, and the function which they perform, it is of vital importance for the effective operation of these hydraulic systems that dirt and similar substances do not enter into the couplings and thereby gain access to the hydraulic system.

It is therefore a primary object of my invention to provide a device which will prevent the coupling members from contacting the ground when the hydraulically connected vehicles suddenly become separated.

It is a further object of my invention to provide a hose supporting device of simple construction and operation and which exerts no undue force on the hose or the break-away couplings when the vehicles are in motion over rough terrain.

It is a still further object of my invention to provide a hose clamping means which while securely holding the hose as far as longitudinal movement is concerned, does not require any bolts, or other types of adjustments.

Yet another object of my invention is to provide a hose supporting device which is simply and economically manufactured, and which is durable and performs its functions in a highly efficient manner.

A hose supporting device embodying the preferred form of my invention is shown in the accompanying drawings wherein.

Figure 1:
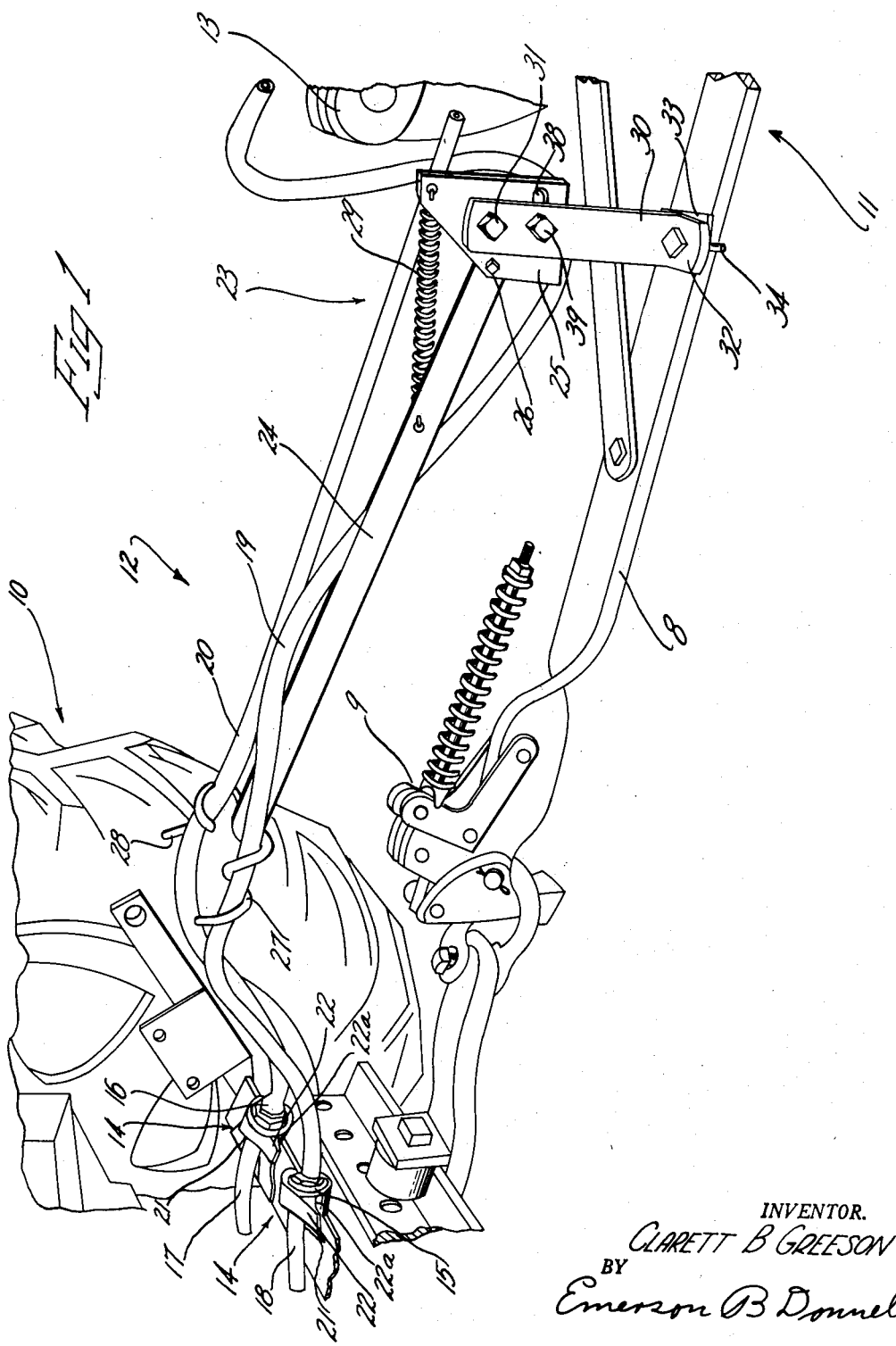
Fig. 1 is a right-side elevational view of my invention employed on an implement which is drawn by a tractor.

As seen in Fig. 1 of the drawings, a tractor 10, only the rear portion of which is shown, is connected to a vehicle or implement 11, only the front portion of which is shown, by a spring break-away hitch 9, of well known construction forming part of the forward extremity of the draw-bar 8 of the implement 11. A hydraulic system 12 extends between the tractor 10 and the implement 11, wherein a hydraulic pressure unit of the tractor 10, of well known construction not shown in the drawings, is adapted to operate a hydraulic ram 13, on the implement 11, only partly shown on the drawings. Valved break-away couplings 14, of common and well known type, comprising in the present instance female members 15 and male members 16, which members are releasably interengaged with one another, are attached to separate flexible conduits 17, 18, 19 and 20. It will be seen in Fig. 1 that the flexible conduits 17 and 18 connect in the present instance the hydraulic pressure unit of the tractor 10 to the female members 15 of the hydraulic couplings 14, which members are secured to the tractor 10 by means of bifurcated supporting brackets 21 and upper and lower clamp segments 22 and 22a. Flexible conduits 19 and 20 in the present instance connect the hydraulic ram 13 of the implement 11 to the male members 16 of the hydraulic couplings 14. It should be clear that when the coupling members 15 and 16 are interengageably connected, the pressure from the hydraulic pressure unit of the tractor 10 can flow through the continuous conduits 17 and 20 or the continuous conduits 18 and 19 to the hydraulic ram 13 of the implement 11.

A hose supporting device, generally designated 23, is swivelly secured in the present instance to the drawbar 8 of the implement 11 and extends forwardly and upwardly. The hose supporting device 23 comprises a forwardly extending support arm or lever 24, pivotally secured adjacent its rearward extremity to a plate 25 as by a bolt or any other suitable means 26.

Figure 4:
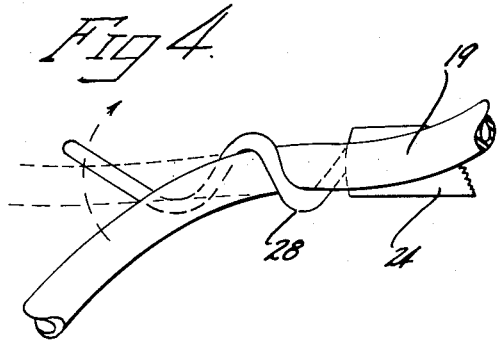
Fig. 4 is an enlarged fragmentary view of the gripping means with the conduit partly held thereby.

Adjacent the forward extremity of the inclining arm 24 are secured a pair of helical coils or gripping means 27 and 28. The conduits 19 and 20 are frictionally held by the helical coils, as far as moving longitudinally through said coils is concerned, by making the inside diameter of the coils 27 and 28 of slightly smaller diameter than the outside diameter of the flexible conduits 19 and 20, while making the longitudinal spacing between the separate convolutions enough greater than the diameter of said flexible conduits so that the latter can be introduced into the clamps by a wrapping or winding operation as illustrated in Fig. 4. It should be appreciated that these coils 27 and 28 provide a very efficient and economical clamping means for the conduits 19 and 20 requiring no adjustment nuts or springs and allowing the operator to easily release the conduits from the coils by simply unwinding the conduits from the inside of the coils. Since the inside diameter of the coils 27 and 28 is slightly smaller than the outside diameter of the conduits 19 and 20, they press gently into the surfaces of the resilient material of the conduits, and longitudinal or sliding movement of the conduits through the spirals can be effected, if at all, only with great difficulty, while the wear which ordinarily results when flexible conduits are secured against moving longitudinally by means of bolts, springs, or other means, is virtually eliminated and the effective life of these conduits is greatly increased.

Figure 2:
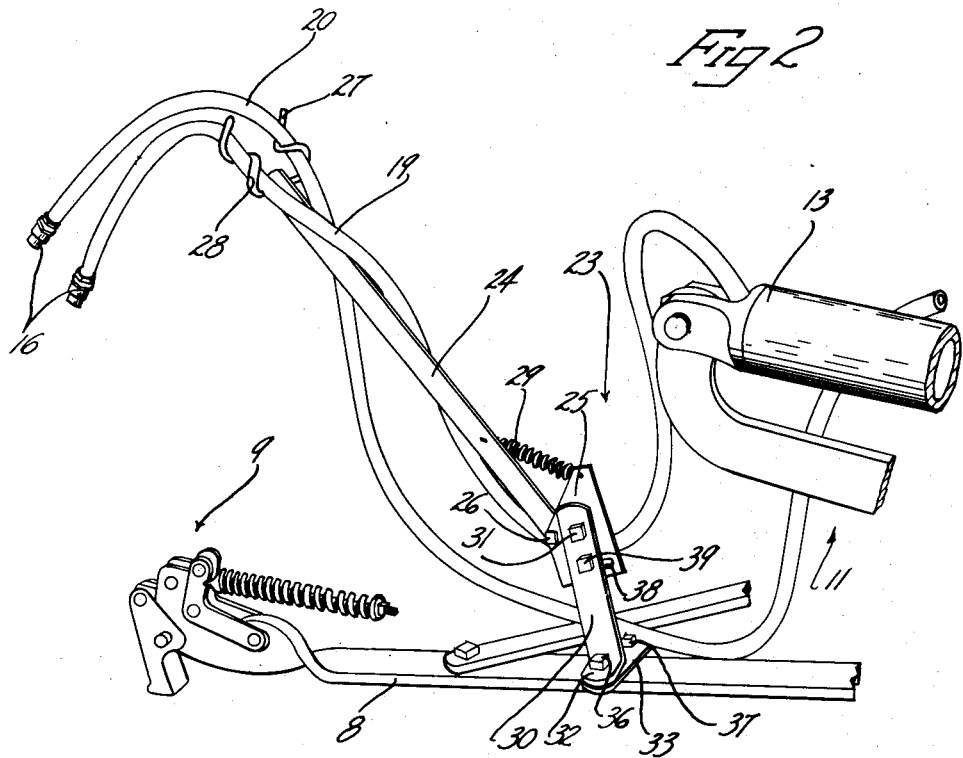
Fig. 2 is a right-side elevational view of my invention showing the position of my invention when the implement suddenly becomes separated from the tractor.
Figure 3:
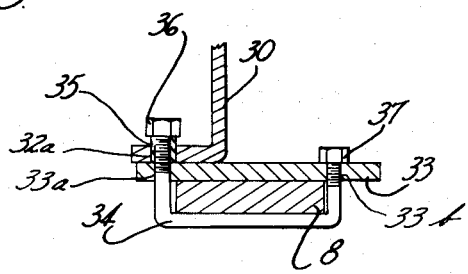
Fig. 3 is an enlarged view taken on the line 3—3 of Fig. 1 with parts removed.

For lifting the conduits at such times as the vehicles become separated, a spring 29 is interposed between the plate 25 and the support arm 24 to pull upwardly so that the moment of the force exerted by the spring 29 about the pivot bolt 26 of the support arm 24 is virtually at any point in the arc of travel of the inclining arm about the bolt 26, only slightly greater than the moment of the force exerted by the combined weights of the inclined arm 24 and the flexible conduits 19 and 20 about the pivot bolt 26. This is accomplished as can be seen in Figs. 1 and 2 by positioning the spring 29 between the support arm 24 and the plate 25 so that the effective leverage of the spring 29 upon the pivot bolt 26 of the arm 24 increases as the force of the spring 29 decreases.

The plate 25 is secured to the upper extremity of a swivel bracket or standard 30 by means of a bolt or other suitable means 31. Swivel bracket 30 has a horizontally directed portion 32 which is provided with a hole 32a to accommodate a vertical pivot and holding assembly for bracket 30. The pivot and holding assembly comprises a holding bar 33 placed in the present instance upon the drawbar 8. A hook bolt 34 passes through holes 33a and 33b formed in the holding bar 33 and hole 32a of the bracket 30 to provide a clamp about the drawbar 8 of the implement. A spacer sleeve 35 is positioned between a nut 36 of the hook bolt 34 and the upper surface of the holding bar 33, and is slightly longer than the thickness of the horizontally directed portion 32 of the swivel bracket 30, thereby allowing the nut 36 and a nut 37 to be firmly tightened securing thereby the swivel bracket 30 and the holding bar 33 to the drawbar 8 but still allowing the swivel bracket 30 to turn freely in the horizontal plane upon the holding bar 33. Because of this freedom of movement in the horizontal plane as well as in the vertical plane, as has already been described, no undue forces are exerted on the conduits 19 and 20 or on the break-away couplings 14 as the implement 11 is drawn over irregular terrain by the tractor 10 or as the tractor 10 changes the direction of travel of the implement 11.

The moment of the force exerted by the spring 29 about the pivot bolt 26 of the support arm 24 can be increased or decreased by pivoting the plate 25 about the bolt 31 along the confines of a slot 38, ridable by a bolt 39 of the swivel bracket 30. It can be seen that by pivoting the plate in one direction, the spring 29 is lengthened whereas, by pivoting the plate in the other direction the spring is shortened. By lengthening the spring 29 the moment of force exerted by the spring 29 upon the arm is increased thereby tending to swing the arm 24 upwardly about the pivot bolt 26. When the correct spring length is found, the bolts 31 and 39 may be tightened thereby holding the plate 25 to the swivel bracket 30.

In the operation of this hose holding device the hoses 19 and 20 are securely held by the helical coils 27 and 28 of the support arm 24. The support arm, due to the greater moment of force as exerted by the spring 29 and as already fully explained, pivots the arm upwardly retained by the forward portion of the conduits 19 and 20 extending from the helical coil 27 and 28 to the couplings 14. The force exerted by the spring 29 upon the arm 24 is not sufficient to disengage the break-away couplings 14 when the members of the couplings are interengaged. When the spring break hitch 9 of the implement 11 releases the tractor 10, as for example when the implement strikes an obstruction, the conduits come under tension, and since the break-away couplings 14 require only a moderate force to become disengaged, the coupling members 16 are pulled out of the coupling members 15 interrupting the flow of pressure through the flexible conduits 17, 18, 19 and 20. When the coupling members 15 become disengaged from the coupling members 16, the support arm 24 is immediately swung upwardly about the pivot bolt 26 by the force of the spring 29. By adjusting the plate 25 along the slot 38, the upward swing of the arm 24 can be increased or decreased. Since the conduits 19 and 20 are prevented from moving longitudinally by the clamping means 27 and 28 as already described, the coupling members 16 are carried upwardly by the arm 24 thereby preventing the danger of dirt and similar material from adhering to the coupling members 16 and possibly entering the hydraulic system.

Various modifications and improvements within the spirit of my invention will doubtless occur to those skilled in the art from the disclosure herein given, and hence I do not wish to be limited to the particular construction shown or uses mentioned except to the extent that my invention is defined in the appended claims, which are to be interpreted as broadly as is consistent with the state of the art.

I claim:

1. On connected implements having a separable hydraulic conduit extending therebetween and fastened thereto, a conduit support comprising a standard swivelly secured with one of said implements about a vertical pivot on the last mentioned implement, a support lever secured with said standard and having a fulcrum for up-and-down movement for supporting said conduit, gripping means for holding said conduit as to longitudinal movement therethrough said gripping means being secured to said support lever, resilient means for continuously urging said support lever and said conduit upwardly about said fulcrum for promptly lifting said condit to an elevated position upon separation thereof from the other implement, said resilient means being anchored between said standard and said support lever, and means for increasing the horizontal moment of force exerted by said resilient means upon said support arm for swinging said lever upwardly.

2. In an implement connected to a tractor by a drawbar and having hydraulic conduits detachably connected to the tractor, in combination, a conduit support comprising a standard swiveled on said drawbar about a vertical pivot, a plate secured to said standard adjacent the upper end thereof and provided with means for adjustment, a support arm pivoted to said plate and extending in the direction of the tractor, holding means secured adjacent the end of said arm and positioned to grip said conduits against longitudinal movement therethrough, and a spring to counterbalance the load of said conduits, one end of said spring being secured to said plate and the other end being secured to said arm at a point remote from said plate.

3. In an implement connected to a tractor by a drawbar and having hydraulic conduits detachably connected to the tractor, in combination, a conduit support comprising a standard swiveled on said drawbar for rotation about a vertical pivot, a plate secured to said standard adjacent the end thereof and provided with means for adjustment, a supporting arm pivoted with said plate and extending in the direction of the tractor, a plurality of helical coils secured to the end of said arm and positioned to grip said conduits within the coils of said helices the inside diameter of said helices being slightly smaller than the outside diameter of said conduits, and a spring to counterbalance the load of said conduits, one end of said spring being secured to said plate and the other end being secured to said arm at a point remote from said plate.

4. In an implement separably connected to a tractor by a drawbar and having a hydraulic conduit separably connected to said tractor, in combination, a conduit supporting device comprising a standard swivelly secured in the horizontal plane to said drawbar and extending upwardly therefrom, a plate secured to said standard adjacent the end thereof and provided with means for adjustment thereof, a support arm pivotally connected to said plate for up-and-down movement and extending outwardly therefrom between said implement and said tractor, a conduit gripping means fixed adjacent the free end of said support arm for frictionally holding said conduit against longitudinal movement while permitting easy removal of said conduit therefrom, and yielding means for continuously urging the support arm upwardly about the pivotal connection, said yielding means being interposed between the plate, secured at a point upwardly of the juncture of the support arm to the plate, and the support arm, secured at a point remote from the standard, so that the effective leverage of the yielding means upon the support arm increases as the force exerted by the yielding means decreases, for promptly lifting said conduit upwardly to an elevated position upon separation of said implement from said tractor and upon subsequent separation of said conduit from said tractor.

5. In an implement separably connected to a tractor by a drawbar and having a separable hydraulic hose connected to said tractor, in combination, a hose supporting device comprising a standard swivelly secured in the horizontal plane to said drawbar and extending upwardly therefrom, a plate secured to said standard adjacent the end thereof and provided with means for adjustment, a support arm pivotally connected to said plate for up-and-down movement and extending outwardly therefrom between said implement and said tractor, hose gripping means fixed adjacent the free end of said support arm, said gripping means comprising helical means for holding said hose, the inside diameter of the individual coils of said helical means being slightly less than the outside diameter of said hose, and yielding means continuously urging the support arm upwardly about said pivotal connection, said yielding means being interposed between the plate, secured at a point upwardly of the support arm to the standard, and the support arm, secured at a point remote from the plate, so that the effective leverage of the yielding means upon the support arm increases as the force exerted by the yielding means decreases, for promptly lifting said hose upwardly to an elevated position upon separation of said hose from said tractor.

6. In an implement connected to a tractor by a drawbar and having hydraulic conduits detachably connected to the tractor, in combination, a conduit support comprising a standard mounted on said drawbar, a plate secured to said standard adjacent the upper end thereof for swinging movement about a transverse pivot, said plate and said standard having clamping means secured thereto for fixing said plate in various stages of adjustment about said pivot with respect to said standard, a support arm pivoted to said plate and extending in the direction of the tractor, holding means secured adjacent the end of said arm and positioned to grip said conduits against longitudinal movement therethrough, and a spring to counterbalance the load of said conduits, one end of said spring secured to said plate at a point displaced vertically from said arm and the other end secured to said arm at a point remote from said plate for continually urging said arm upwardly, pivotal adjustment of said plate being effective to alter the force of said spring.

References Cited in the file of this patent

UNITED STATES PATENTS

| | | |
|---|---|---|
| 1,644,661 | Anfenast | Oct. 11, 1927 |
| 1,746,151 | Goldman | Feb. 4, 1930 |
| 1,933,919 | McPherson | Nov. 7, 1933 |
| 1,940,701 | Shope | Dec. 26, 1933 |
| 2,013,447 | Reiter | Sept. 3, 1935 |
| 2,215,292 | Koscierzyna | Sept. 17, 1940 |
| 2,450,714 | Campbell | Oct. 5, 1948 |
| 2,492,049 | Krone et al. | Dec. 20, 1949 |